US008208906B2

(12) United States Patent
Farris et al.

(10) Patent No.: US 8,208,906 B2
(45) Date of Patent: Jun. 26, 2012

(54) ENHANCED INTERFACE FOR MOBILE PHONE

(75) Inventors: Jack M. Farris, Randolph, NJ (US); Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 12/327,374

(22) Filed: Dec. 3, 2008

(65) Prior Publication Data

US 2010/0137028 A1 Jun. 3, 2010

(51) Int. Cl.
*H04W 88/02* (2009.01)
(52) U.S. Cl. .................................................. 455/414.1
(58) Field of Classification Search .................. 455/411, 455/414.1; 715/863, 769; 725/6; 345/520
See application file for complete search history.

(56) References Cited

U.S. PATENT DOCUMENTS

| | | | |
|---|---|---|---|
| 2004/0037159 A1* | 2/2004 | Gomm et al. | 365/233 |
| 2004/0123095 A1* | 6/2004 | Marshall | 713/153 |
| 2004/0204074 A1* | 10/2004 | Desai | 455/557 |
| 2009/0058822 A1* | 3/2009 | Chaudhri | 345/173 |
| 2009/0277958 A1* | 11/2009 | Lobo | 235/380 |
| 2011/0061100 A1* | 3/2011 | Mattila et al. | 726/17 |

* cited by examiner

*Primary Examiner* — Diane Mizrahi (57) ABSTRACT

A docking station may provide an enhanced user interface for mobile communication devices. In one particular implementation, a device may include a base unit configured to provide connections to one or more user interface devices and an interface for connecting to a mobile phone, where the base unit connects the mobile phone to the one or more user interface devices to provide an enhanced interface for the mobile phone.

19 Claims, 7 Drawing Sheets

ENHANCED INTERFACE FOR MOBILE PHONE

BACKGROUND INFORMATION

In an increasingly digitally connected world, telecommunication services play a crucial role in the daily operation of businesses and in consumers' lives. Telecommunication services commonly used by both businesses and consumers include telephone, network (e.g., Internet) connectivity, and television. These services are typically provided to the customer premises by a telecommunication provider through one or more wired or wireless connections.

Mobile communication devices (e.g., cell phones), in particular, are frequently used by consumers to wirelessly receive information (e.g., web and email) and communicate with other consumers. For portability, mobile communication devices are typically made as small and light as possible. While a small device can be convenient for a user to carry, a small device can have limited input/output capabilities, such as a small display and keyboard, and a speaker with a limited audio range.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein provide for a docking station that includes an enhanced user interface for mobile communication devices. Data, such as video, audio, or images may be received by the mobile communication device over a wireless (e.g., cellular network) and displayed (or audibilized) via the docking station or other output devices connected to the docking station. Additionally, the mobile communication device may receive data (e.g., video clips, images, etc.) from the docking station.

Figure 1:
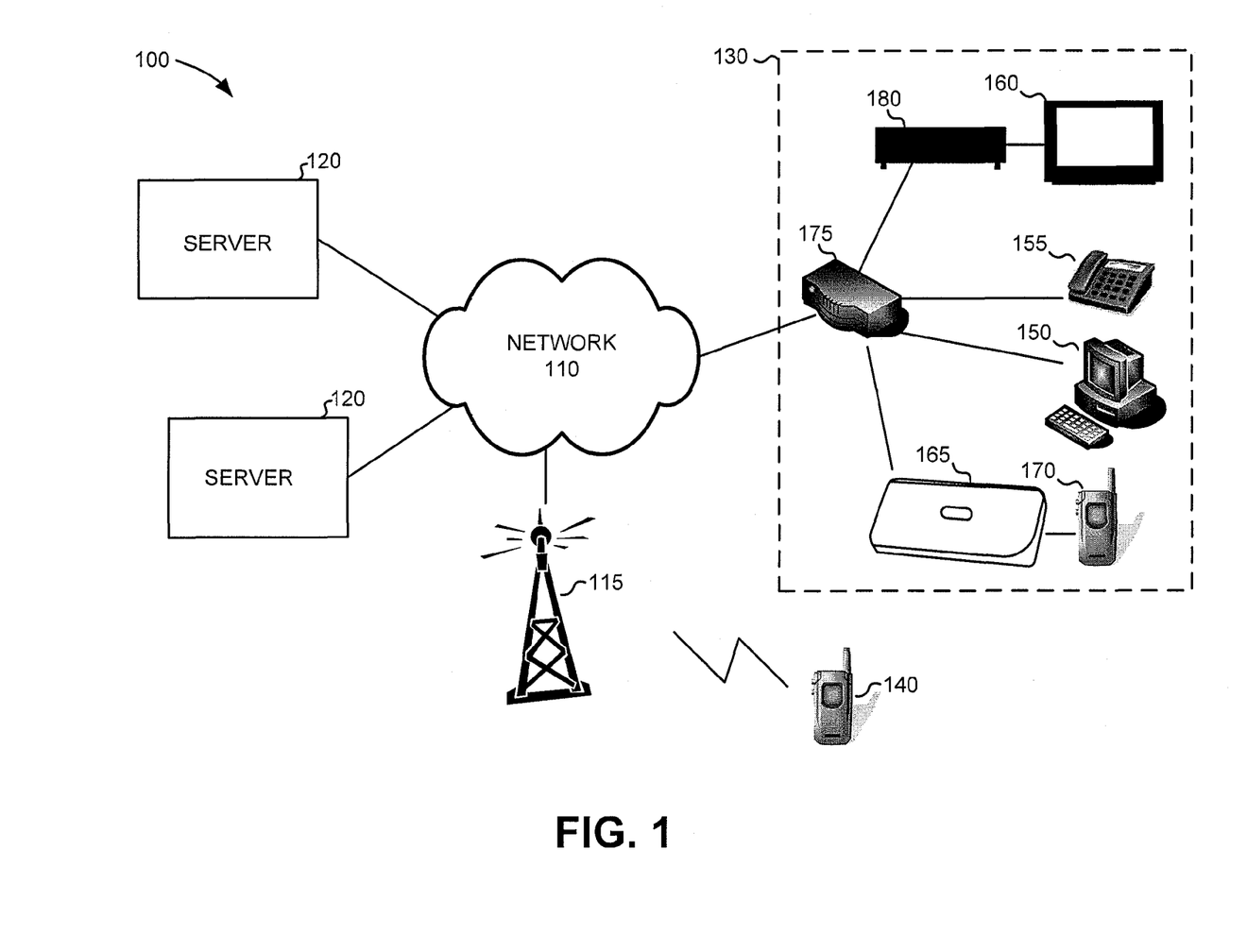
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects one or more server devices 120 to a consumer/customer premises 130 and/or a mobile phone (i.e., a mobile communication device) 140. In general, server devices 120 may provide or control, via network 110, telecommunication services such as telephone, television, data network connectivity (e.g., Internet), and/or wireless mobile connectivity (e.g., cellular phone connectivity).

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to customer premises 130. In one implementation, network 110 may terminate at customer premises 130 via an optical communication link, such as an optical fiber to the customer premises. In another possible implementation, network 110 may terminate at customer premises 130 via a coaxial cable or other types of wired mechanisms.

An antenna 115 is also shown in FIG. 1 to illustrate that network 110 may include wireless nodes, such as nodes used to implement a cellular network. Mobile phone 140 may, for instance, connect to voice and data services through a cellular network that includes network 110 and antenna 115.

Server devices 120 may include servers or other network devices used to deliver or control delivery of the telecommunication services to customer premises 130 and/or mobile phone 140. For example, server devices 120 may include web servers, network switches or routers, network gateways, television broadcast facilities, etc.

Customer premises 130 may include a number of electronic devices, such as computing device 150 (e.g., a personal computer), telephone 155, television 160, mobile device docking station 165, and mobile phone 170. Customer premises 130 may additionally include devices that provide an interface to computing device 150, telephone 155, television 160, and mobile device docking station 165, such as a local gateway 175 and a set-top box (STB) 180.

Computing device 150 may include, for example, a personal computer, such as a desktop computer, a laptop computer, a personal digital assistant (PDA), etc., used for general computing tasks.

Telephone 155 may include a standard analog phone or a VoIP (voice over IP) phone. As a VoIP phone, telephone 155 may be a stand-alone telephone capable of initiating VoIP calls over network 110 or a "soft-phone" that is implemented as software on computing device 150.

Television 160 may include a digital or analog television through which a user may watch programming. For example, television 160 may include a high-definition television (HDTV) set.

Docking station 165 may include a device designed to be coupled with mobile devices, such as with mobile phone 170. Docking station 165 may include hardware and/or software designed to enhance the user interface of mobile phone 170. For instance, docking station 165 may connect to or include an integrated display, keyboard, mouse, speakers, or other devices that may be used to supplement or enhance the user interface provided by mobile phone 170. Docking station 165 will be described in more detail below.

Gateway 175 may include a network device that provides an interface from network 110 to personal computer 150, telephone 155, docking station 165, and STB 180. For example, when telecommunication services are provided to customer premises 130 via optical fiber, gateway 175 may include an optical network terminal (ONT) to connect to the optical fiber. The ONT may convert between signals appropriate for devices 150/155/160/165/180 and signals appropriate for transmission over optical fiber. For example, the ONT may include an Ethernet output port that connects to personal computer 150 and VoIP telephone 155, and a coaxial cable that connects to television 160 or STB 180.

STB 180 may include components for selecting and/or obtaining content that may be shown or played on television 160. STB 180 may receive a television signal from gateway 175, convert the signal to a form usable by television 160, and transmit the signal to television 160, via a video output port, for display. STB 180 may receive commands, such as commands transmitted via a remote control, and control television 160 accordingly. STB 180 may also be capable of sending data to server devices 120. For example, users may use a remote control or wireless keyboard to interact with STB 180 and television 160 in an interactive session.

In general, customer premises 130 may be either a residential or business location. Additionally, although only a single personal computer 150, telephone 155, television 160, and docking station 165 are shown in FIG. 1, it can be appreciated that any particular customer premises 130 may have any number (including none) of any of these devices. Further, although a single customer premises 130 is shown in FIG. 1, servers devices 120 may typically interact with many customer premises.

Figure 2:
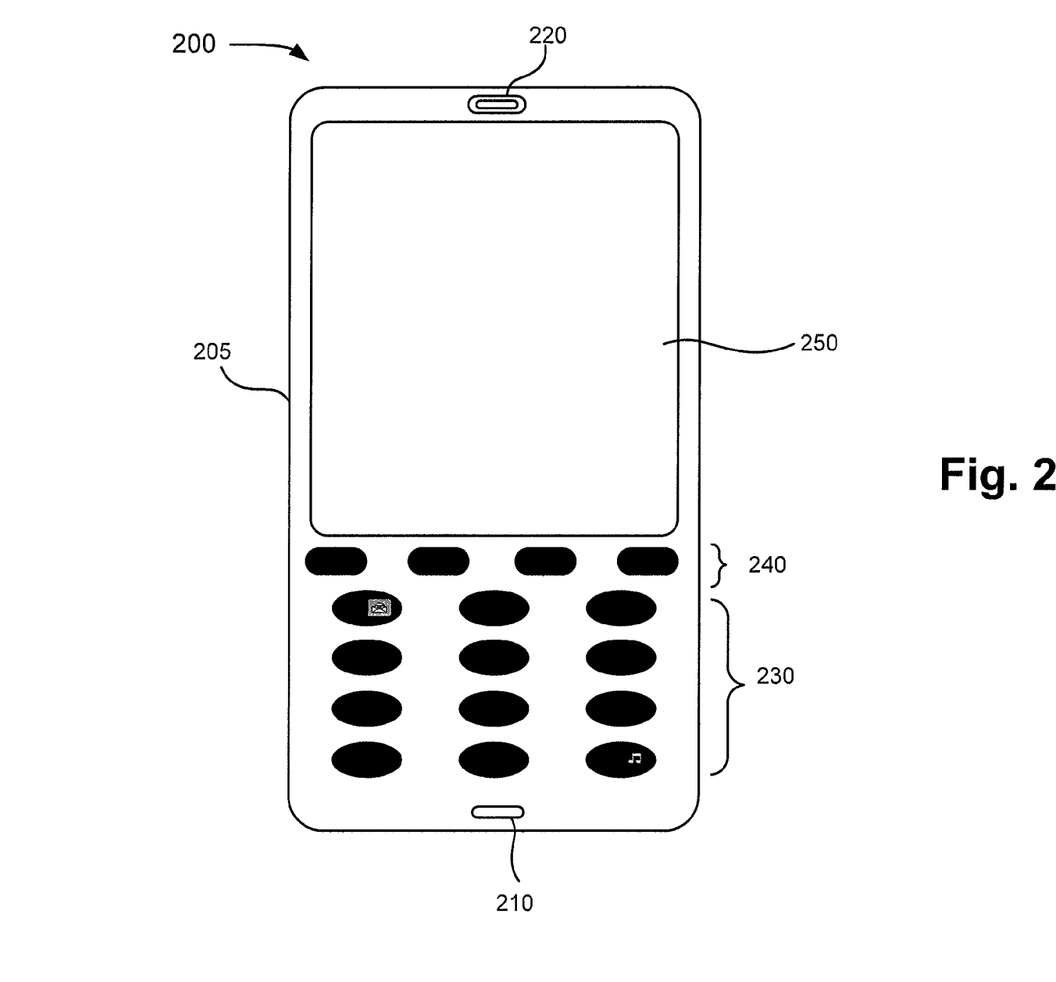
FIG. 2 is a diagram illustrating an exemplary mobile phone in additional detail.

FIG. 2 is a diagram illustrating a mobile phone 200, such as mobile phones 140 and 170, in additional detail. As illustrated, mobile phone 200 may include a housing 205, a microphone 210, a speaker 220, a keypad 230, function keys 240, and a display 250.

Housing 205 may include a structure configured to contain components of mobile phone 200. For example, housing 205 may be formed from plastic and may be configured to support microphone 210, speaker 220, keypad 230, function keys 240, and display 250.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to mobile phone 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to mobile phone 200. Function keys 240 may include a key that permits a user to cause mobile phone 200 to perform one or more operations. The functionality associated with a key of function keys 240 may change depending on the mode of mobile phone 200. For example, function keys 240 may perform a variety of operations, such as placing a telephone call, playing various media, setting various camera features (e.g., focus, zoom, etc.) or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information.

It can be appreciated that, in general, mobile phone 200 may be constructed as a relatively small device in order to make it portable. Making the device portable, however, may require design tradeoffs that result in a relatively small display 250, a low quality speaker 220, and/or a keypad 230 with a limited number of keys or with small keys.

Consistent with aspects described herein, docking station 165 may provide an enhanced user interface for mobile phone 200.

Figure 3A:
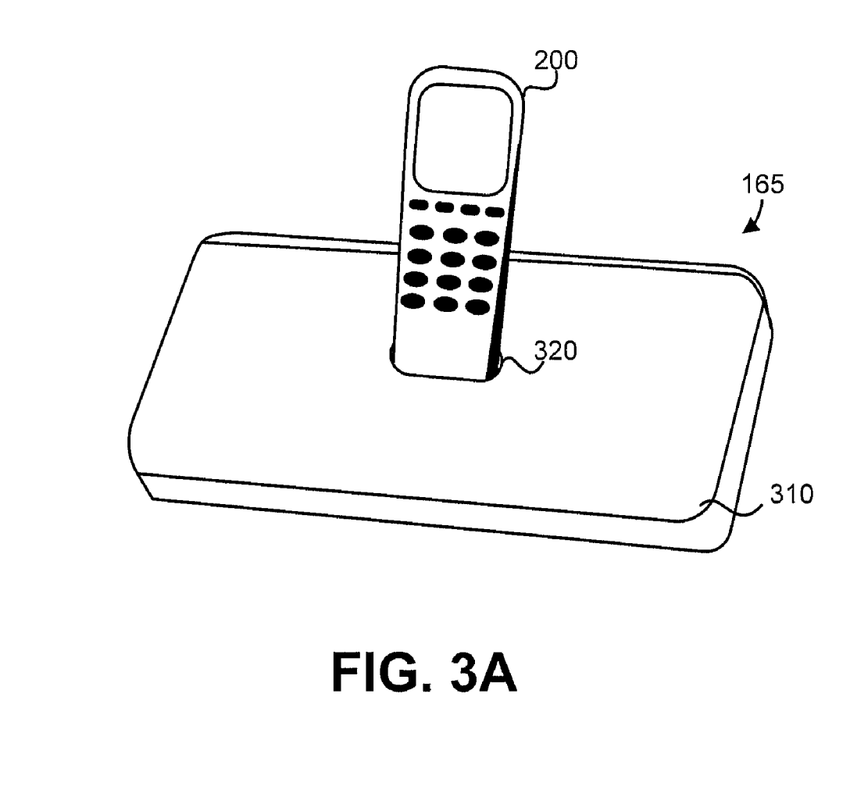
FIGS. 3A and 3B are diagrams illustrating an exemplary implementation of a docking station.
Figure 3B:
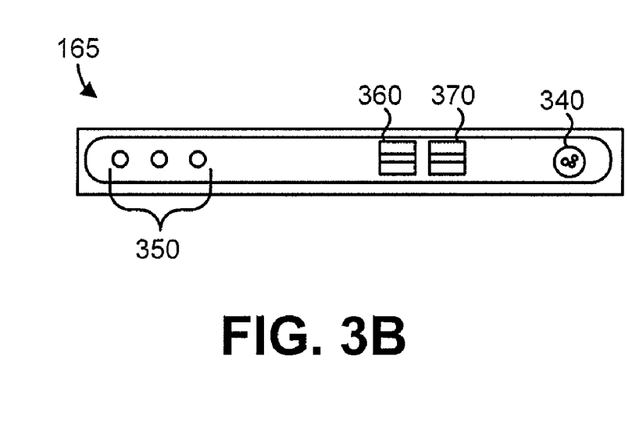

FIGS. 3A and 3B are diagrams illustrating an exemplary implementation of docking station 165. FIG. 3A is a perspective view of docking station 165 and FIG. 3B is a rear view of docking station 165.

As shown in FIG. 3A, docking station 165 may include a base unit 310 that includes a slot 320. Slot 320 may be designed as a physical interface for inserting and fixedly holding a portable communication device, shown as mobile phone 200. Slot 320 may include conductive connectors for connecting to a corresponding set of connectors in mobile phone 200.

Docking station 165 may include a number of external connectors that may be used to extend the user interface for mobile phone 200. As shown in FIG. 3B, docking station 165 may include one or more video connectors 340 (e.g., analog or DVI connectors), audio connectors 350, network connector 360 (e.g., an Ethernet port), or other connectors 370 (e.g., a USB or an IEEE 1394 connection). Appropriate input/output devices, such as a monitor for video connector 340, speakers or microphones for audio connectors 350, and a network cable for network connector 360, may be connected to connectors 340-370. When connected, mobile phone 200 may use the connected device in place of or in addition to the corresponding device of the mobile phone. For example, an LCD monitor connected to video connector 340 may be used to display what would normally be displayed on display 250 of mobile phone 200.

In some implementations, instead of connecting to mobile phone 200 using a physical slot in which the mobile phone is inserted, as shown in FIG. 3A, docking station 165 may connect to mobile phone 200 through a wired connection. For instance, a USB cable may be connected between mobile phone 200 and docking station 165.

Some mobile phones may have, in addition to a wireless connection to a cellular communication network, the ability to connect wirelessly using local wireless links, such as a local WiFi or Bluetooth network. In these situations, docking station 165 may connect wirelessly through the local wireless links to the mobile phone.

Additionally, although docking station 165 is shown in FIGS. 3A and 3B as a docking station 165 that includes connections 340-370 to which external devices may be connected, in some implementations, the external devices may be directly integrated into docking station 165. For example, docking station 165 may include an integrated LCD display, speakers, or a keyboard.

In some implementations, docking station 165 may also include the ability to charge a battery of mobile phone 200 when mobile phone 200 is connected to docking station 165.

In yet another possible implementation, docking station 165 may be included as part of the functionality of set-top box 180. In other words, set-top box 180 may function as a docking station in addition to the normal functions of the set-top box. In this situation, users may particularly use television 160 as an audio/video interface for mobile phone 200.

Figure 4:
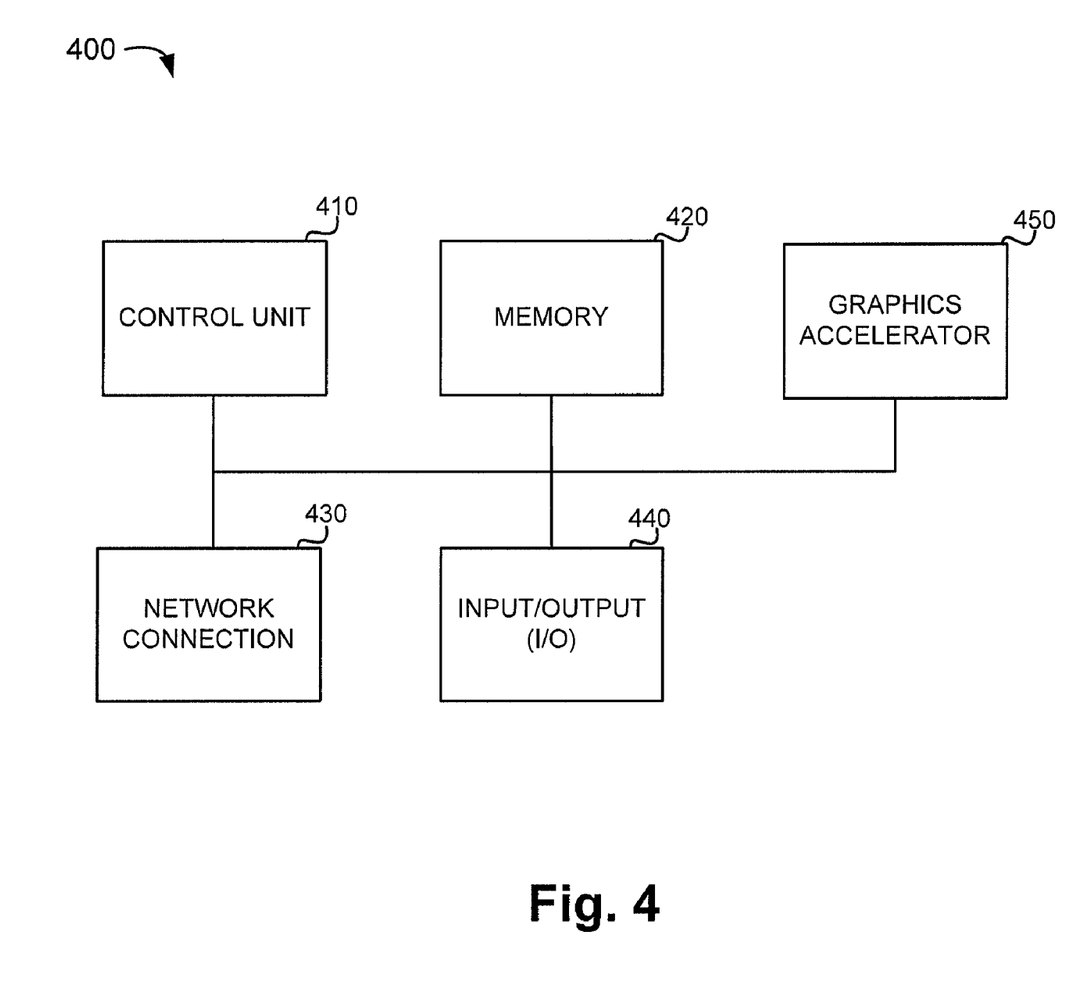
FIG. 4 is diagram illustrating exemplary components relating to one of the devices shown in FIGS. 1, 2, 3A, and/or 3B.

FIG. 4 is diagram illustrating exemplary components relating to a device 400, such as one or more of the devices shown in FIGS. 1-3. In one particular implementation, device 400 may represent docking station 165. Device 400 may include control unit 410, memory 420, network connection 430, input/output (I/O) device 440, and graphics accelerator 450.

Control unit 410 may include a processor, microprocessor, or other type of processing logic that may interpret and execute instructions. Memory 420 may include a dynamic or static storage device that may store information and instructions for execution by control unit 410. For example, memory 420 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Network connection 430 may include any transceiver-like mechanism that enables device 400 to communicate with other devices and/or systems. For example, network connection 430 may include an Ethernet interface, an optical interface, a coaxial interface, a radio interface, or the like. Network connection 430 may allow for wired, wireless, and/or optical communication. Network connection 430 may be particularly configured to connect device 400 to a packet-based IP network.

Input/output devices 440 may generally include user input devices such as external buttons, a keyboard, mouse, display, speakers, or connections for connecting to such devices. Input/output devices 440 may also include logic for implementing external connection standards, such as a USB (universal serial bus) connection. With input/output devices 440, a user may generally interact with device 400 or other device connected to device 400, such as mobile phone 200.

Graphics accelerator 450 may include circuitry or other logic for performing graphic manipulation or display related options. In general, graphics accelerator 450 may generate and output images for display. When device 400 is a docking station, graphics accelerator 450 may particularly provide for enhanced graphic display abilities beyond what is available in mobile phone 200. In this situation, graphics accelerator 450 may be used to drive displays having a resolution greater than the display embedded in mobile phone 200.

Although FIG. 4 illustrates exemplary components of device 400, in other implementations, device 400 may include fewer, additional, and/or different components than those depicted in FIG. 4. In still other implementations, one or more components of device 400 may perform one or more other tasks described as being performed by one or more other components of device 400.

Figure 5:
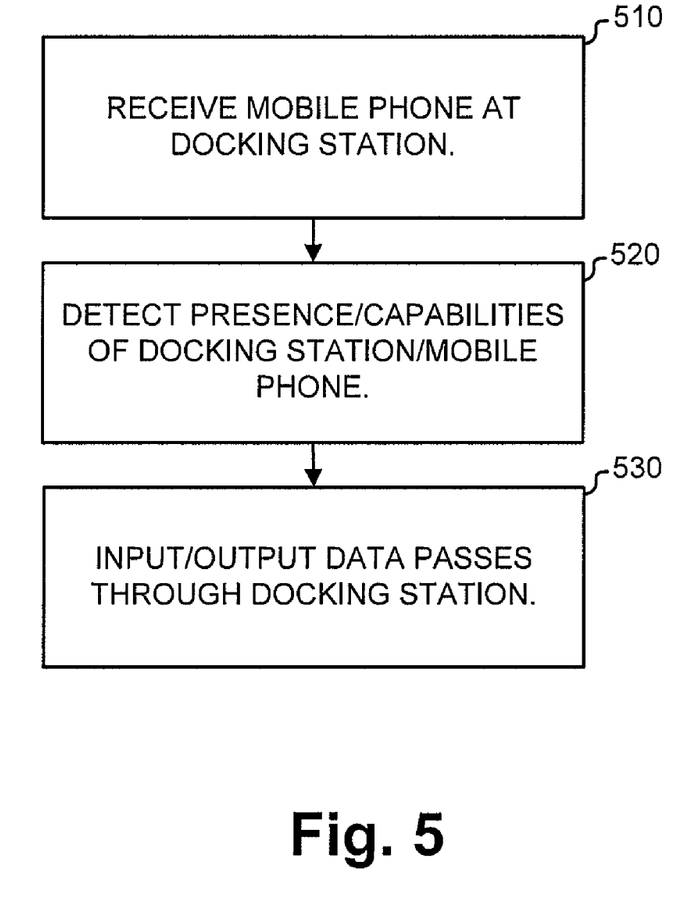
FIG. 5 is a flow chart illustrating exemplary operations for providing an enhanced interface to a mobile phone.

FIG. 5 is a flow chart illustrating exemplary operations for providing an enhanced interface to a mobile phone.

A user may decide to connect their mobile phone to the docking station, such as by connecting mobile phone 200 to docking station 165. Docking station 165 may thus receive the mobile phone (block 510). As previously discussed with respect to FIGS. 3A and 3B, mobile phone 200 may be connected to docking station 165 in a number of ways. For example, mobile phone 200 and docking station 165 may be designed to include a physical slot compatible with docking station 165. Alternatively, mobile phone 200 and docking station 165 may be connected using a cable or wire, such as via a USB connection between mobile phone 200 and docking station 165. Alternatively, mobile phone 200 and docking station 165 may connect through a local wireless connection.

Once connected, docking station 165 and mobile phone 200 may communicate with one another. In one implementation, docking station 165 and mobile phone 200 may automatically detect the presence of and/or exchange capabilities with one another (block 520). For example, using a predefined protocol, mobile phone 200 may determine that docking station has an external display and a serial input device (e.g., a keyboard) available for use by mobile phone 200. In response, mobile phone 200 may begin to, through docking station 165, display visual output to the external display and receive input from the serial input device.

The user may next begin to use mobile phone 200 and docking station 165 in conjunction with one another. Input/output information (relative to mobile phone 200), may thus pass through docking station 165 (block 530). In one implementation, mobile phone 330 may generally continue to operate as normal, except that mobile phone 200 may additionally use the input/output functions provided by docking station. As mentioned previously, mobile phone 330 may output information to an external display, speaker, or other device that is enabled through docking station 165. Depending on configuration options and user options, mobile phone 200 may either continue to use its integrated output device or may disable its integrated output device. For instance, the user may desire that when displaying information to an external display, mobile phone 200 should continue to display the same image to its integrated display. When outputting audio to an external speaker, however, the user may desire that the integrated speaker of mobile phone 200 be disabled. As another example, if a keyboard is connected to docking station 165, mobile phone 200 may receive input keystrokes from both the external keyboard and the keypad of mobile phone 200, or alternatively, from just the external keyboard.

Docking station 165 may be connected to an external network, such as via an Ethernet or WiFi (IEEE 802.11) connection. In these situations, docking station 165 may be used to provide an additional source of network connectivity to mobile phone 200.

A number of exemplary implementations of a docking station being used with a mobile phone will next be discussed.

Figure 6:
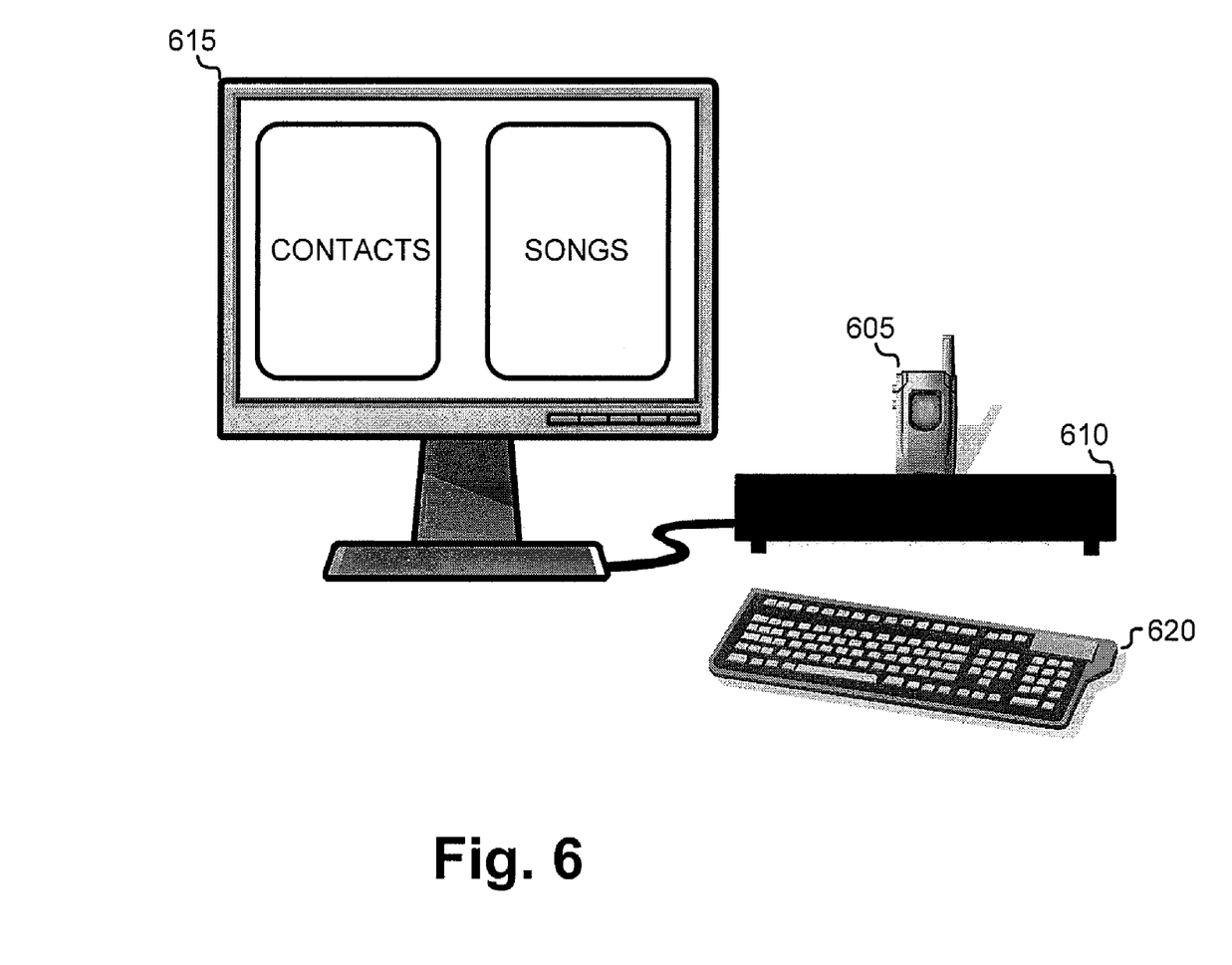
FIG. 6 is a diagram illustrating an exemplary configuration of a system using a docking station.

FIG. 6 is a diagram illustrating an exemplary configuration of a system using a docking station. In this example, assume a user has physically inserted a mobile phone 605 into a docking station 610 using a matching slot designed as part of docking station 610 and mobile phone 605. Docking station 610 may be used to provide an enhanced display, via display 615, and enhanced input, via keyboard 620, for mobile phone 605. Additionally, docking station 610 may charge the battery of mobile phone 605 while it is in docking station 610.

In this example, the user is using display 615 to manage contacts and songs stored on mobile phone 605. The user may also, for example, use display 615 to view content stored on mobile phone 605, such as pictures taken with mobile phone 605. The larger screen size of display 615, relative to the display of mobile phone 605, may provide the user with a richer experience than when interacting with only mobile phone 605.

As another example, consider the situation in which mobile phone 605 includes broadband access, such as EVDO (Evolution-Data Optimized) wireless broadband. Using the robust interface provided by display 615 and keyboard 620 may enhance the broadband experience.

Figure 7:
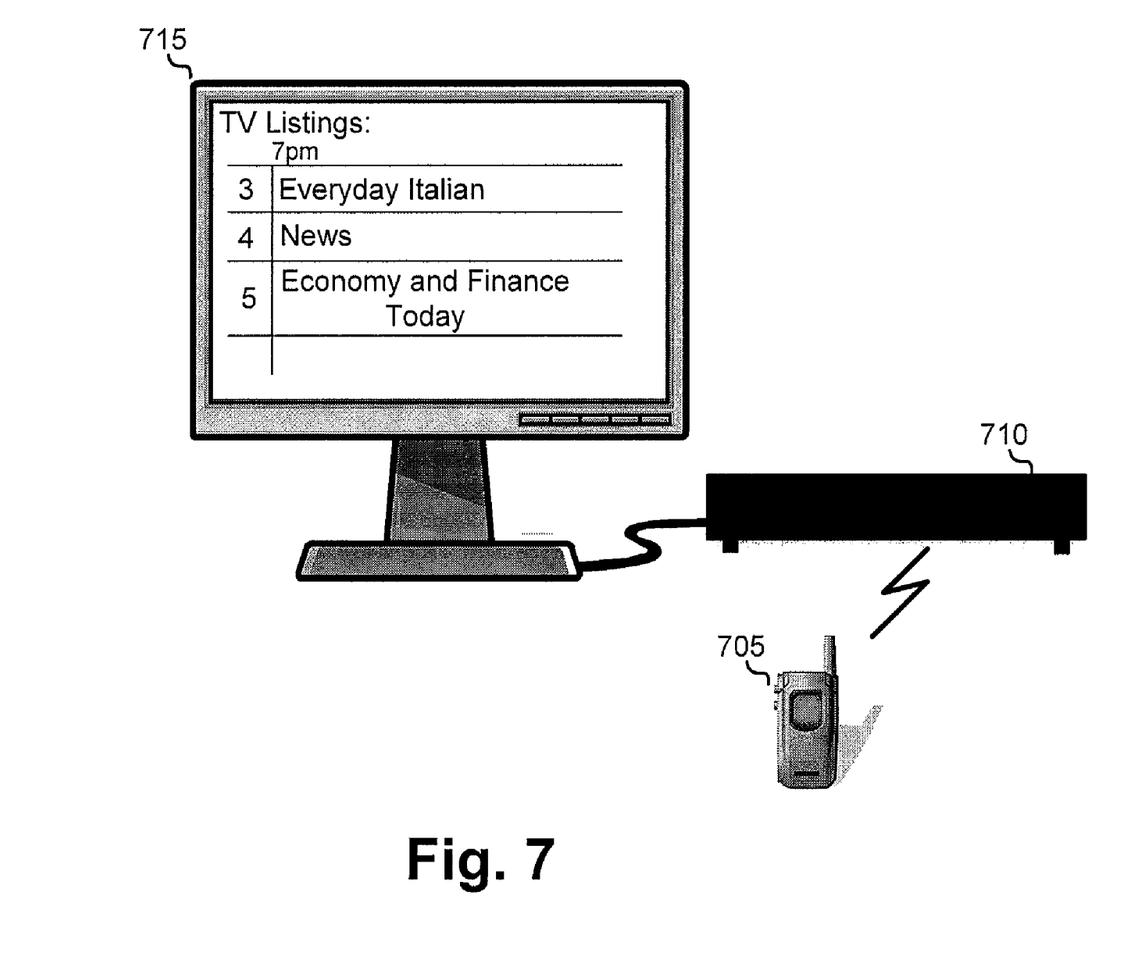
FIG. 7 is a diagram illustrating a second exemplary configuration of a system using a docking station.

FIG. 7 is a diagram illustrating a second exemplary configuration of a system using a docking station. In this example, assume that a mobile phone 705 is connected to a docking station 710 via a local wireless connection, such as a local WiFi or Bluetooth connection. Further, assume docking station 710 is a set-top box that outputs to a television 715. Here, a user may, for instance, access or configure information of mobile phone 705 in a manner similar to that discussed above in the example of FIG. 6.

Additionally, the user may use mobile phone 705 to view or control aspects of their television service. More particularly, set-top box 710 may be a set-top box that provides the user with a number of options relating to television viewing. For example, the set-top box may allow the user to view upcoming broadcasts, schedule broadcasts for recording, view a list of broadcasts that were previously recorded, or receive alerts and notifications through the set-top box.

As is particularly shown in FIG. 7, television listings are being displayed on television 715. The user may control the television listings, such as by controlling the date/time or range of channels to view, using a keypad of mobile phone 705.

As another example of set-top box 710 and mobile phone 705, consider the situation in which the user requests service through set-top box 710. For instance, the user may use mobile phone 705 to order a video on demand (VOD) program through set-top box 710. The program may be uploaded to mobile phone 705, through the local connection with set-top box 710, for later playback when desired by the user.

Although docking station 165 was generally described above as a docking station at a customer premises, docking station 165 could also be located in public places. For example, docking stations 165 may be placed at kiosks in airports or other locations. Mobile users may use these docking stations while on-the-go. A network of docking stations 165 may thus be implemented and potentially associated with a company that deploys and services the docking stations. Users may, for instance, create an account with the company that allows the user to use any of the docking stations in the network controlled by the company.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to the process illustrated in FIG. 5, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A device comprising:
a base unit to provide one or more connections to one or more user interface devices, where the one or more user interface devices include a display, and where the device is associated with a set-top box coupled to the display; and
a processor to:
communicate with a mobile device,
identify at least one input/output device associated with the mobile device, and
automatically connect the mobile device to the one or more user interfaces devices based on the identified at least one input/output device,
where the processor, when connecting the mobile device to the one or more user interfaces devices, is further to:
enable a user to select, using the at least one input/output device, multimedia content, through the display, by the set-top box,
enable the user to request, using the at least one input/output device, the multimedia content, and
upload, through one or more connections and in response to the request, the multimedia content from the set-top box to the mobile device.

2. The device of claim 1, where the base unit further includes:
a graphics accelerator to provide a video signal to the display.

3. The device of claim 1, where the base unit includes a slot, and
where the base unit is further to:
automatically detect insertion of the mobile device into the slot of the base unit.

4. The device of claim 1, where one or more of the user interface devices are integrated with the base unit.

5. The device of claim 1, where the base unit is further to:
provide, to the mobile device, access to a connection to a wide area network.

6. The device of claim 1, where the base unit is further to:
communicate operational features of the base unit to the mobile device.

7. A method, comprising:
identifying, using a base unit connected to a mobile device, at least one input/output device associated with the mobile device; and
connecting, using the base unit, the mobile device to one or more user interface devices based on the identified at least one input/output device, where the one or more user interface devices include a display, and where the base unit is associated with a set-top box coupled to the display, and
where the connecting the mobile device to the one or more user interfaces devices includes:
enabling a user to select, using the at least one input/output device, multimedia content presented, through the display, by the set-top box,
enabling the user to request, using the at least one input/output device, the multimedia content from the set-top box, and
uploading, in response to the request, the multimedia content from the set-top box to the mobile device.

8. The method of claim 7, where connecting the mobile device to the one or more user interface devices comprises:
connecting the mobile device to the display.

9. The method of claim 8, further comprising:
providing a video signal to the display via a graphics accelerator located in the base unit.

10. The method of claim 7, further comprising:
automatically detecting, via the base unit, insertion of the mobile device into a slot in the base unit.

11. The method of claim 7, further comprising:
integrating the one or more of the user interface devices into the base unit.

12. The method of claim 7, further comprising:
connecting, via the base unit, the mobile device to a wide area network.

13. The method of claim 7, further comprising:
communicating, via the base unit, operational features of the base unit to the mobile device.

14. A system, comprising:
a memory to store one or more instructions; and
a processor to execute the instructions to:
  establish communications between a mobile device to a base unit;
  identify at least one input/output device associated with the mobile device; and
  connect the mobile device to one or more user interface devices based on the identified at least one input/output device,
  where the processor, when connecting the mobile device to the one or more user interfaces devices, is further to:
    enable a user to select, using the at least one input/output device, multimedia content presented, through a display, by a set-top box,
    enable the user to request, using the at least one input/output device, multimedia content from the set-top box, and
    upload, through one or more connections and in response to the request, the multimedia content from the set-top box to the mobile device.

15. The system of claim 14, where the processor is further to:
communicate operational features of the mobile device to the base unit.

16. The system of claim 14, where the base unit includes a graphics accelerator to provide a video signal to the display, and
where the processor is further to:
  adjust, through the graphics accelerator, the video signal based on an input received through the mobile device.

17. The system of claim 14, where the base unit includes a slot, and
where the processor is further to:
  automatically detect insertion of the mobile device into the slot.

18. The system of claim 14, where one or more of the user interface devices are integrated with the base unit.

19. The system of claim 14, where the base unit includes a connection to a wide area network, and
where the processor is further to:
  provide the mobile device with access to the connection to a wide area network.

* * * * *